United States Patent [19]

Boucher et al.

[11] 4,425,796
[45] Jan. 17, 1984

[54] HERMETICALLY SEALED TANK GAUGE APPARATUS

[76] Inventors: Harry Boucher, 1410 E. 6th, Odessa, Tex. 79762; Jack L. Hubbard, P.O. Box 600, Gardendale, Tex. 79758

[21] Appl. No.: 450,821

[22] Filed: Dec. 20, 1982

[51] Int. Cl.³ .............................................. G01F 23/10
[52] U.S. Cl. ....................................... 73/312; 346/72
[58] Field of Search .................... 73/312, 308, 321; 33/126.5, 126.6; 346/72, 139 D

[56] References Cited

U.S. PATENT DOCUMENTS

| | | | |
|---|---|---|---|
| 681,536 | 8/1901 | Friez | 73/312 |
| 2,120,719 | 6/1938 | Spaeth | 73/321 |
| 2,741,126 | 4/1956 | Anderson et al. | 33/126.5 X |
| 3,088,318 | 5/1963 | Steil | 73/312 |
| 3,217,541 | 11/1965 | Williamson | 73/321 |
| 3,459,042 | 8/1969 | Brown | 73/321 |
| 3,504,369 | 3/1970 | Kashkin, Jr. et al. | 346/139 D |
| 4,045,876 | 9/1977 | Bowen | 33/126.6 |
| 4,065,968 | 1/1978 | Sunagawa | 73/321 X |
| 4,192,187 | 3/1980 | Kennedy et al. | 33/126.5 |
| 4,255,859 | 3/1981 | Klieman | 33/126.6 |

*Primary Examiner*—Daniel M. Yasich
*Attorney, Agent, or Firm*—Marcus L. Bates

[57] ABSTRACT

A hermetically sealed tank gauge apparatus which continuously monitors the fluid level in a closed crude oil tank. A sensor device measures the liquid level in the tank. The sensor device communicates with the interior of the tank, and is isolated from ambient, so that no dangerous gases can escape from the tank, through the tank gauge apparatus, and into the surrounding atmosphere. The sensor device is arranged to continuously drive a recorder apparatus in response to change in liquid level thereof so that the quantity of fluid flowing into and out of the tank over a long interval of time can be ascertained. The sensor device and the recorder are tamper proof and enable accurate records of tank contents to be recorded.

3 Claims, 10 Drawing Figures

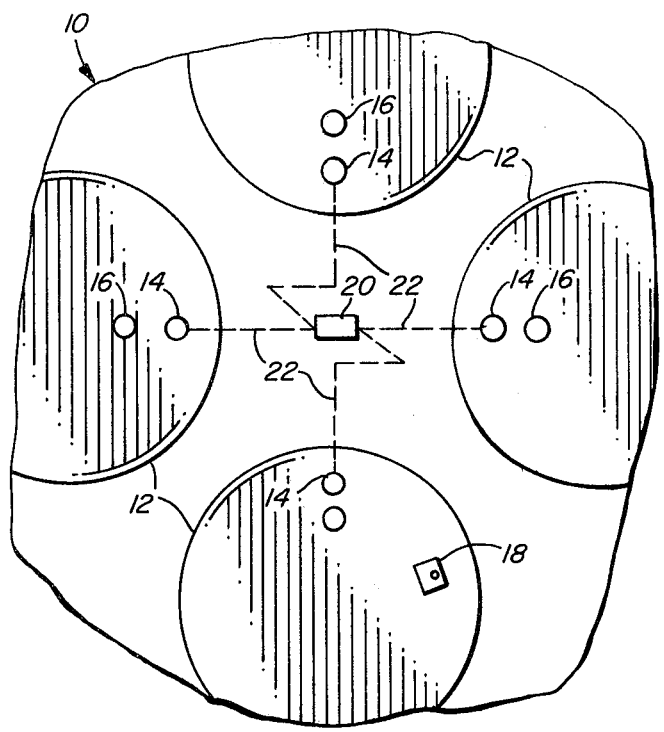
FIG.-1
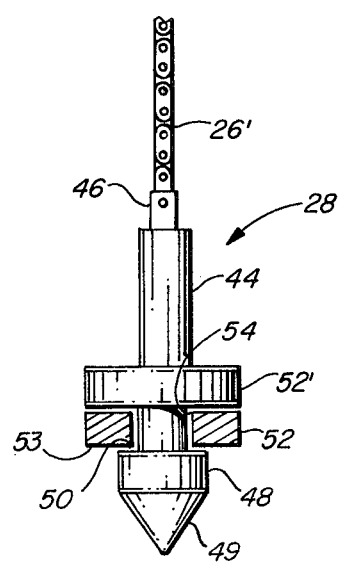
FIG.-3
FIG.-4
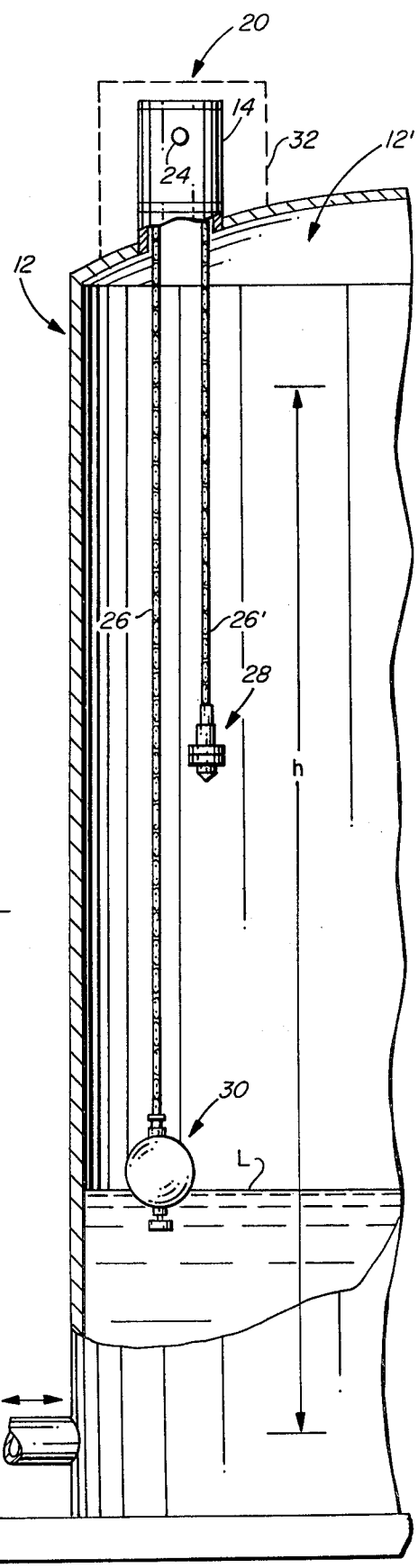
FIG.-2

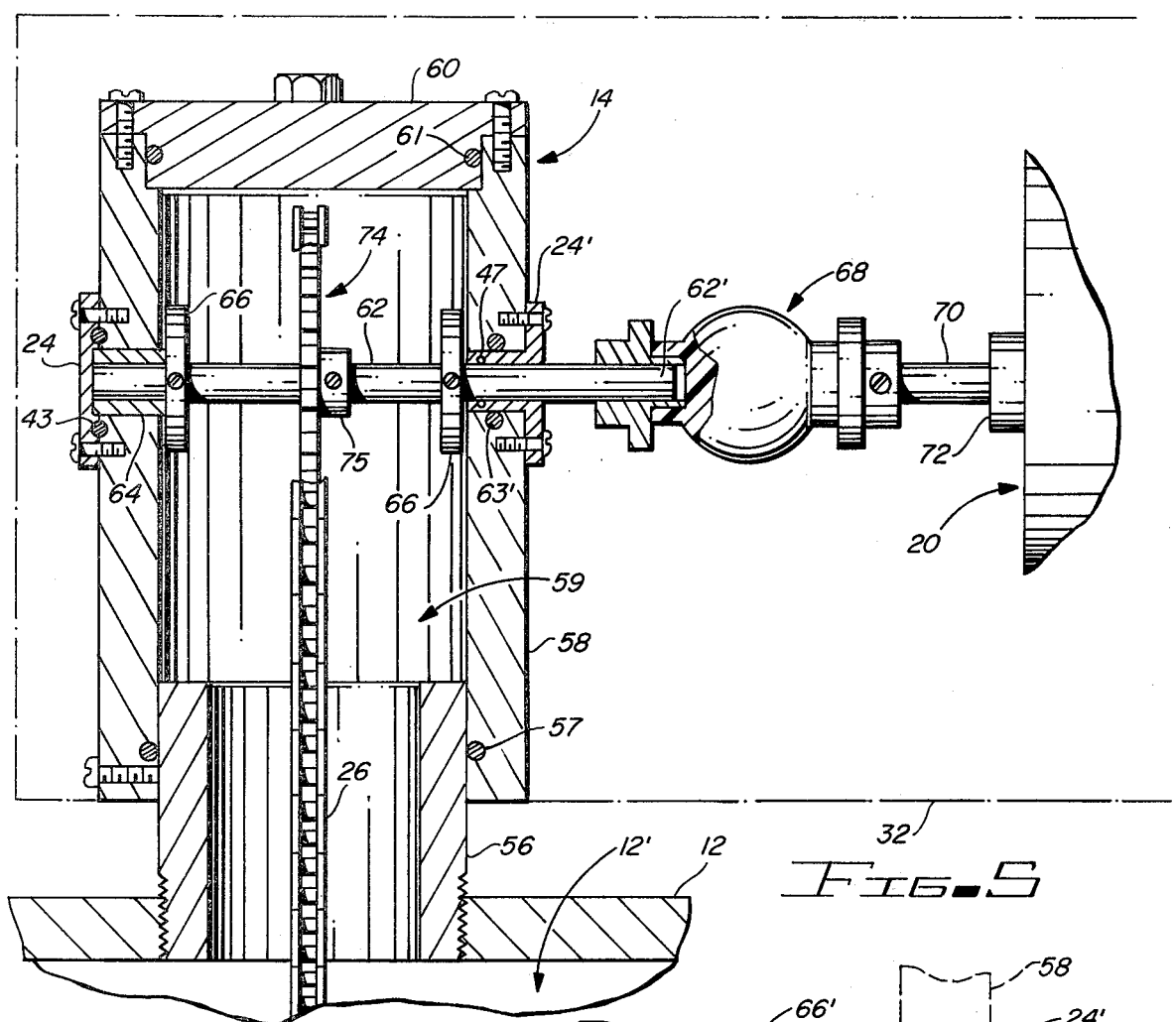
FIG-5
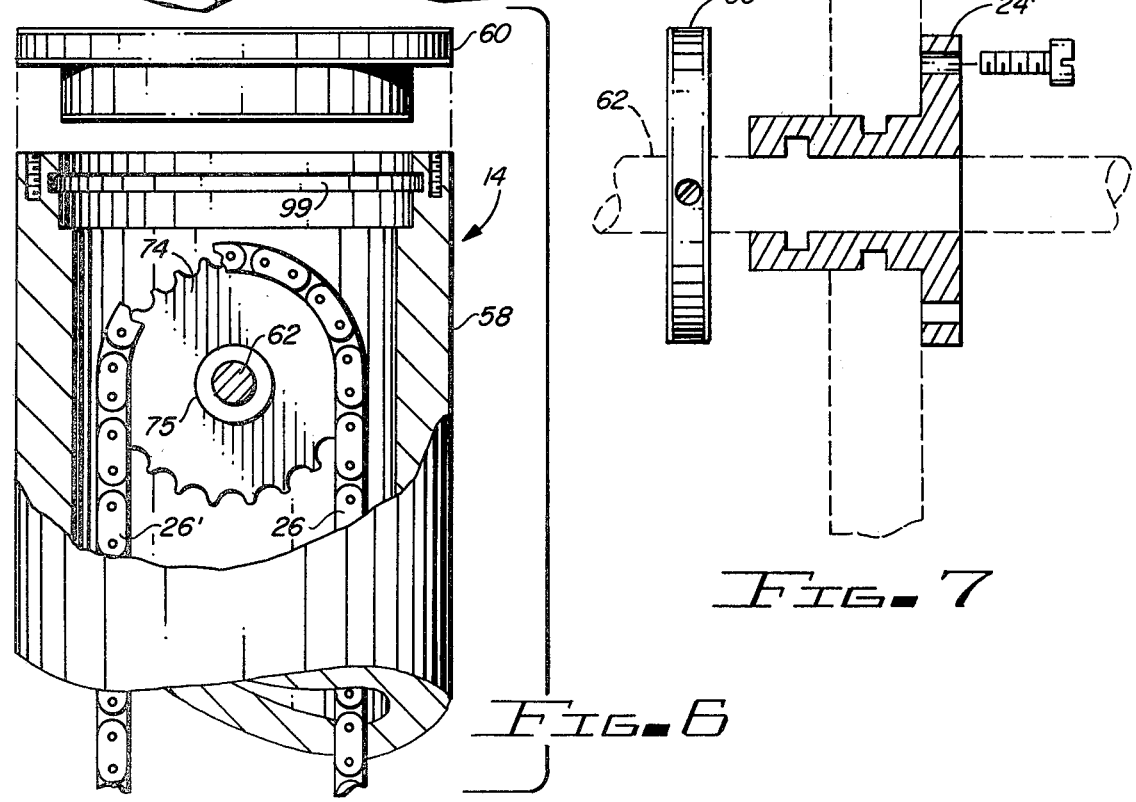
FIG-7
FIG-6

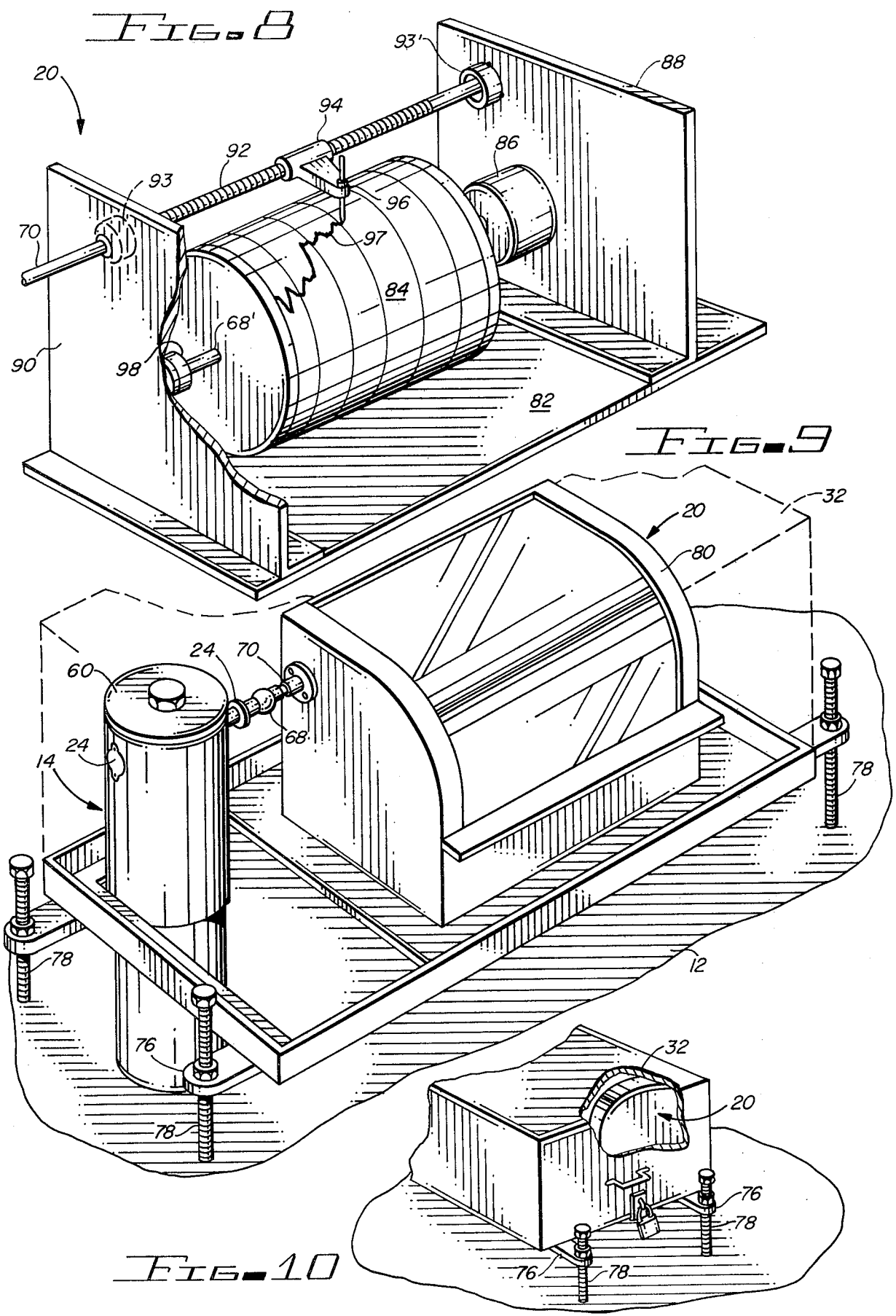

HERMETICALLY SEALED TANK GAUGE APPARATUS

BACKGROUND OF THE INVENTION

A few years ago crude oil sold for about $3.00 a barrel and therefore did not attract the attention of thieves because a considerable amount of labor usually is involved in stealing crude oil. Moreover, an entire tank truck load of crude oil would only fetch $1,000.00–$2,000.00, and even after a tank truck load of crude oil had been stolen, it was often difficult to find someone to purchase the stolen goods. But times have changed and now a tank truck load of crude is worth $5,000.00–$8,000.00 and accordingly, crude oil theft is a worthwhile consideration of the more robust type of thief.

Out in the desolate west, crude continuously flows from an oil well into a stock tank. The tank may hold several truck loads of oil. A pumper drives about the isolated region, occasionally gauging and checking the level in the tanks. The pumper is sometimes negligent and fails to close the various incoming and outgoing flow lines properly. This oversight could result in thousands of dollars of crude being inadvertently transferred into a flow line and accordingly, the owner of the well would not be paid. It is also possible under these circumstances for a crude oil thief to transfer a tank truck load of oil from the stock tank into a transport truck without being noticed. This is especially so when the crude oil thief is associated with a pumper of the criminal type.

Most oil wells produce a considerable amount of sour gas. The sour gas migrates from the liquid contained within a stock tank and constitutes part of the vapor phase of the tank. In order to gauge a tank, the pumper opens a manhole, and drops a weighted flexible rule or tape to the bottom of the tank, and thereafter calculates the depth of the crude contained within the tank. After the pumper has opened the appropriate valves to transfer the crude oil from the tank into the sales oil line, he again gauges the tank and the difference in the measured liquid levels is used to calculate the payment to the owner of the oil well. This type of measurement depends to a large extent upon the care with which the pumper measures the tank contents.

Moreover, opening the manhole at the top of the tank is dangerous because it is always possible for sour gases containing hydrogen sulfide to be breathed by a pumper, thereby poisoning the pumper, which sometimes results in death.

Therefore, it would be desirable to have a measuring and recording apparatus which absolutely monitors and records the variable liquid level of a stock tank. It would also be desirable to be able to maintain an accurate record of this changing liquid level activity. It would especially be desirable to be able to monitor the fluid flow into and out of the tank without subjecting anyone to the deleterious effects of the sour gas contained within the gaseous phase of the stock tank. These desirable attributes are provided by the present invention.

RELATED PRIOR ART

Campbell U.S. Pat. No. 56,702 discloses a float which drives a continuous chain, and an indicator is driven by the chain for determining liquid level. Gould, U.S. Pat. No. 1,656,705 illustrates a tank gauge having a float 24, weight 26, and sensor device driven by a chain 19 of limited length. Data is recorded at 16 related to the change in the fluid level. Eynon, U.S. Pat. No. 1,997,434 is similar to Campbell, and interposes a spring means 16 within the continuous chain.

Smith U.S. Pat. No. 1,208,026; Rathbone, et al U.S. Pat. No. 1,886,304; Tokheim, U.S. Pat. No. 2,237,461; Barbe, U.S. Pat. No. 1,558,452; Szabo U.S. Pat. No. 1,918,672; Guthmann, U.S. Pat. No. 2,531,774; and Kennedy U.S. Pat. No. 4,192,187 also provide liquid level recording devices by which liquid level changes can be recorded.

However, none of the above art discloses a sensor device which can be used in conjunction with highly corrosive liquids and gases, as for example hydrogen sulfide, wherein the sensor device is hermetically sealed and isolated from the gaseous phase of the liquid level being monitored. Moreover, none of the above cited art suggests a combination sensor and recorder apparatus such as taught in the instant disclosure.

SUMMARY OF THE INVENTION

Apparatus for measuring the volumetric changes in a tank. The apparatus comprises a sensor arranged to sense changes in the liquid level of the tank and is connected to provide a corresponding signal to a recorder means.

The sensor includes a rotatable wheel supported in journaled relationship within a housing, and the housing is sealed to the upper wall of the tank. A float device and a special weight are connected to opposite ends of a flexible chain, with the medial portion of the chain drivingly engaging the pulley.

In the preferred form of the invention, the chain is made of stainless steel covered with urethane which is quite durable in the corrosive tank atmosphere. The float device is a hollow stainless steel sphere having a removable weight adjustably affixed to one end thereof to thereby enable the buoyancy thereof to be adjusted. The weight includes an elongated central member having an abutment formed at the lower end thereof, and a plurality of weights removably received in stacked relationship about the central member in supported relationship respective to the abutment.

A drive shaft sealingly extends through a wall of the housing, thereby enabling the interior of the housing to communicate with the vapor space of the tank, and at the same time preventing poisonous gases from emerging therefrom. The recorder means continuously records data related to the liquid level contained within the tank. The recorder means includes drive means by which rotational motion of the shaft provides a signal for the recorder, wherein the signal is related to the volumetric change of the liquid contained within the tank.

Accordingly, a primary object of the present invention is the provision of a sensor device and recorder combination for continuously sensing the volumetric change of liquid contained within a tank.

Another object of the present invention is the provision of a sensor device for driving a recorder means, all of which is hermetically sealed respective to the interior of an oil field tank, so that the volumetric change of liquid contained within the tank is continuously recorded to thereby enable the tank to be continuously gauged in a safe and unusual manner.

A further object of the present invention is the provision of means for continually and safely gauging a tank in a manner whereby the volumetric change in the liquid contained within the tank is continuously recorded over a substantially long period of time.

A still further object of the present invention is the provision of a tamper proof gauging apparatus which continuously monitors and records the volumetric change of crude oil contained within a crude oil tank.

An additional object of the present invention is the provision of an improved sensor device which safely provides a signal related to the volumetric change of the liquid level contained within a tank.

Another and still further object of the present invention is the provision of an improved, safe, theft proof apparatus for gauging the contents of an oil tank which reduces inadvertent loss of liquid therefrom.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a fragmentary, part schematical, part diagrammatical, top plan view of a tank farm having a plurality of recorder devices made in accordance with the present invention;

FIG. 2 is a fragmentary, part cross-sectional, side elevational view of apparatus made in accordance with the present invention shown in conjunction with a tank;

FIG. 3 is an enlarged, detailed, part cross-sectional, side elevational view of part of the apparatus disclosed in FIG. 2;

FIG. 4 is an enlarged, part cross-sectional, side elevational view of part of the apparatus disclosed in FIG. 2;

FIG. 5 is an enlarged, fragmentary, part cross-sectional, side view of part of the apparatus disclosed in FIG. 2;

FIG. 6 is a fragmentary, part cross-sectional, part disassembled view of part of the apparatus disclosed in FIG. 5;

FIG. 7 is an enlarged, disassembled, cross-sectional view of part of the apparatus disclosed in FIG. 5;

FIG. 8 is a perspective view of part of the apparatus disclosed in FIGS. 1 and 2; with some parts being broken away therefrom;

FIG. 9 is another perspective view of part of the apparatus disclosed in FIGS. 1 and 2; and, FIG. 10 is a broken perspective view of part of the foregoing apparatus.

DETAILED DESCRIPTION OF THE PREFERRED EMBODIMENTS

In FIGS. 1 and 2 of the drawings, there is disclosed apparatus for measuring and recording the volumetric change in a tank. The apparatus comprises a sensor and a recorder. The sensor includes a housing affixed to the upper wall of the illustrated tank, and a wheel or pulley contained therewithin is rotatably mounted to be moved by a flexible chain having the terminal ends thereof connected to a float device and to a counterweight. The housing is hermetically sealed to the top of the tank so that no outward flow from the gaseous phase of the tank occurs.

As particularly seen illustrated in FIG. 1 of the drawings, a tank farm 10 includes a plurality of tanks 12, each having a sensor 14, made in accordance with the present invention, mounted to a wall thereof. The top of the tanks include the usual vent line opening 16 and the usual manhole 18.

In the embodiment of FIG. 1, a bank of recorders 20, preferably stacked one on top of the other, receive a signal by means of a plurality of rotatable shafts 22, with each of the recorders at 20 preferably being connected to one of the sensors 14 by means of one flexible drive shaft 22.

In the embodiment of the invention set forth in FIG. 2, there is disclosed more specifically the details of the before mentioned sensor 14. Numeral 24 broadly indicates a drive shaft end which sealingly extends from the housing 14. A chain has the marginal ends 26, 26' thereof arranged to downwardly extend from the interior of the housing, with one end of the chain being attached to an adjustable counterweight 28, and the other end of the chain being connected to a float device 30. Numeral 32 broadly indicates a cover which completely encloses both the sensor device and the recorder apparatus.

In FIG. 3, the float device 30 is seen to be comprised of a hollow stainless steel sphere having a coupling 36 affixed at the upper end thereof by which the terminal end of chain 26 is attached thereto by means of a pin 38. The opposed side of the sphere is provided with a coupling 40, similar to coupling 36, for threadedly receiving the illustrated shaft to which there is removably connected a weight 42. The weight 42 is adjusted to cause the equatorial plane of the sphere to coincide with liquid level L when the float 34 is suspended in the tank liquid.

FIG. 4 illustrates the details of the before mentioned counterweight 28, which comprises an elongated cylindrical central member 44 having a fastener means 46 located at the upper extremity thereof by which the terminal end 26' of the chain is releasably affixed thereto. The weight includes an enlarged head 48 which forms an abutment in the form of a circumferentially extending shoulder 50. A plurality of weights 52, 52', preferably annular in form, are supported from shoulder 50 of the abutment. The enlarged head preferably converges in a downward direction in the form of a cone 49.

In FIG. 5, the before mentioned tank 12 is seen to include a vapor space 12' located above liquid level L (FIG. 2). A nipple or cylindrical pipe 56 is suitably affixed to the roof or upper wall of the tank. O-ring 57 is placed within an O-ring receiving groove formed on the interior wall surface of the cylindrical housing 58. The interior 59 of housing 58 communicates with the vapor space 12' of the tank 12. A removable cover 60 forms a closure means at the upper marginal end of housing 58, and relies upon a circumferentially extending O-ring 61 received within groove 99 for hermetically sealing the interior 59 of the housing respective to the ambient.

A device shaft 62 is arranged normally to the longitudinal axial centerline of the housing 58. A bearing 64, which can be made of Teflon (T.M.), rotatably supports one end of shaft 62 from the wall of the housing 58. Keepers 66, 66' prevent longitudinal movement of the shaft 62 by capturing the shaft respective to the interior sidewalls of the housing.

A universal joint 68 form means by which the end of a second or threaded shaft end 70 of recorder 20 is connected respective to the drive shaft end 62' of the sensor apparatus. Bearing housing 72 rotatably supports one end of the second shaft 70.

A wheel 74, preferably in the form of a stainless steel sprocket, is provided with a boss 75 which is secured in a removable manner to a medial portion of drive shaft 62. The shaft 62 preferably is made of stainless steel.

The chain 26 is in the form of urethane coated stainless steel wire and is available from Winfred Berg, Inc., 499 Ocean Ave., East Rockaway, Long Island, N.Y., and is identified as "Flex E Pitch".

The universal joint 68 is a commercially available item, which can take on several different forms.

As seen in FIGS. 8 and 9 and in particular FIG. 9, a support frame 76 is supported from the top of tank 12 by means of leveling screws 78. The recorder apparatus 20 is housed within an enclosure 80 which protects the interior thereof and provides additional means by which the chart thereof can be protected from tampering.

As seen in FIG. 8, the recorder apparatus includes a floor 82, preferably in the form of a heavy plate of aluminum, with supporting parallel sides 88, 90 being attached to the floor 82 and placed in spaced relationship respective to one another. A high torque clock 86 is automatically wound periodically by an auxiliary battery powered electrical device. The clock is geared to drive shaft 68 one revolution each 8 days. The shaft 68 has opposed ends supported in suitable bearing, one of which is seen at 98. The bearing 98 are supported by the opposed chart sidewalls 88, 90.

A threaded marginal length 92 of drive shaft 70 is provided with four acme threads per inch. The drive shaft 92 is supported in low friction relationship by opposed bearings or journals 93, 93'. The journals 93, 93' are supported by the opposed end walls 88, 90.

A pin 96 provides indicia 97 on chart 84, with the indicia being related to the volumetric change within the interior of tank 12, which is also a function of the change in liquid level L thereof.

A tamper proof enclosure 32 is formed about the sensor and recorder, with the enclosure forming a weather proof cover having the lower end thereof attached to the before mentioned support frame 76. The apparatus of the present invention is installed on top of a tank by utilizing an existing cylindrical pipe or nipple 56. The interior 59 of the housing 58 is isolated from ambient by means of seals 57, 61, 43, and 47.

In FIGS. 2 and 3, the float 30 is adjusted by removing or adding weight at 42 until the equitorial plane of the sphere coincides with the liquid level L, thereby increasing accuracy of the spherical type float.

The weight 28 seen in FIGS. 2 and 4, is likewise adjusted by adding or removing weight at 52, 52' until the desired tension is placed on the chain 26, 26'. It is preferred to adjust the weights at 28 and thereafter make a final adjustment of the weight 42.

As the liquid level L of FIG. 2 changes, the float 30 rises or descends vertically within the interior of the tank 12. This action causes the weight 28 to move vertically up or down in response to the change in the liquid level L. Movement of float 30 rotates the sprocket 74, which in turn drives the drive shaft 62. Shaft 62 drives the second shaft 70 of recorder 20. In the preferred embodiment, the sprocket is 6 inches in diameter, and each rotation of shaft 70 moves pin 96 one-fourth inch along the chart 84, thereby providing indicia 97 related to time (drum rotation) and liquid level.

Once every 8 days the person responsible for the produced oil must climb up on the tank, remove the tamper proof cover 32, open the recorder cover 80, and remove the chart 84 from the drum. A new chart is placed on the drum, the covers are both replaced, and the battery for the chart drive mechanism replaced as may be necessary.

The recorder 20 makes a chart 84. The chart can be made in duplicate and retained for a permanent record. The data 97 placed on the chart 84 can be used by the oil companies or governmental agencies to establish the production rate and to verify the quantity of crude made and sold. The chart is also valuable for proving the royalty payment due to the mineral owner or to other parties of interest.

I claim:
1. Hermetically sealed safety apparatus for measuring volumetric changes of a liquid contained within a tank comprising:
   a sensor device, a recorder apparatus;
   said sensor device includes a cylindrical housing affixed to a wall of the tank, a wheel rotatably mouned within said housing, a flexible chain, a float device connected to one end of the chain and a counterweight connected to the other end of the chain;
   said float device is a hollow sphere having a removable weight affixed thereto to thereby enable the buoyance thereof to be adjusted so that the liquid level of the tank is located near the equitorial plane of the sphere;
   a medial length of the chain engages and rotatably drives said wheel, a drive shaft, means by which said drive shaft is journaled to the housing, means by which said drive shaft is connected to be rotated by said wheel so that rotational motion of said drive shaft provides a signal for said recorder;
   a marginal length of the said drive shaft extends through a wall of the housing, seal means between said marginal length of said shaft and the housing;
   means hermetically sealing the housing to the tank so that any gaseous phase contained within the tank is isolated from ambient;
   said recorder apparatus includes a main housing and a drum, means on said drum for continuous recording of data related to the liquid level contained within the tank; a threaded shaft means journaled respective to said main housing, a scribe, a nut means threadedly engaging said threaded shaft for driving said scribe, and means connecting said drive shaft to said threaded shaft so that vertical movement of said float in response to change in the liquid level rotates said wheel, which rotates said drive shaft, which rotates said threaded shaft and causes said scribe to move along the drum;
   a framework attached to the tank, said recorder apparatus is supported by said framework, an enclosure means removably affixed to said framework and enclosing said sensor device and recorder apparatus therewithin, so that said sensor device and said recorder apparatus cannot be tampered with until the enclosure means is removed.

2. The apparatus of claim 1 wherein said counterweight includes an elongated central member having an abutment means formed at the lower end thereof, a plurality of weights removably received in stacked relationship about the central member and in supported relationship respective to the abutment means, to thereby enable the weight of the counterweight to be adjusted by changing the number of weights received about the central member.

3. Hermetically sealed safety apparatus for measuring the volumetric changes in a tank comprising:

a recorder; a sensor device including a cylindrical housing;

a cylindrical pipe attached to and upwardly extending from the tank; said cylindrical pipe is telescopingly received by a marginal length of said housing, and seal means between said housing and pipe;

a wheel rotatably mounted within said housing, a flexible chain, a float device connected to one end of the chain and a counterweight connected to the other end of the chain; a medial length of the chain engages and drives said wheel, a drive shaft journaled to and extending into said housing, means by which said drive shaft is connected to be rotated by said wheel;

means hermetically sealing the housing respective to the tank so that the gaseous phase of the tank is isolated from ambient; a marginal length of said drive shaft extends through a wall of said housing so that rotational motion of said drive shaft provides a signal for said recorder; said means hermetically sealing includes seal means between said marginal length of said shaft and said housing;

said recorder includes means for continuous recording of data related to the liquid level contained within the tank;

said float device is a hollow sphere having a removable weight affixed thereto to thereby enable the buoyance thereof to be adjusted so that the liquid level of the tank can be located at the equitorial plane of the sphere;

said recorder includes a main housing and a drum, means rotating said drum, a second shaft means rotatably journaled within said main housing, a scribe, means for driving said scribe in response to rotation of said second shaft means, and means connecting one end of said drive shaft to one end of said second shaft means so that vertical movement of said float in response to change in the liquid level of the tank rotates said wheel, which rotates said drive shaft, which rotates said second shaft and moves said scribe along the chart;

a framework, said recorder is supported by said framework, an enclosure means removably affixed to said framework and enclosing said sensor and recorder therewithin, so that said sensor and said recorder cannot be tampered with until the enclosure is removed.

* * * * *